Figure 1:
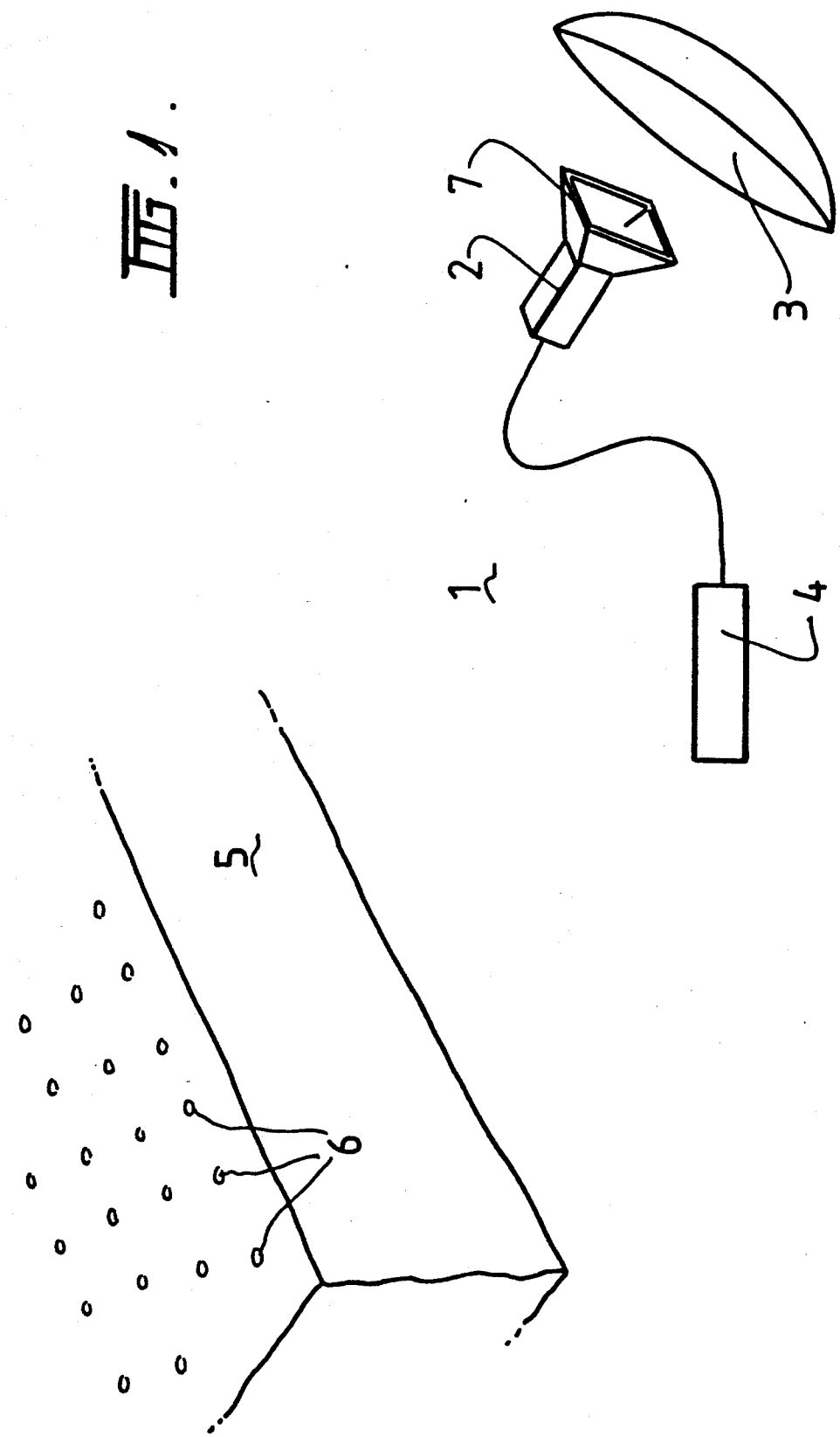

United States Patent [19]

Beattie et al.

[11] Patent Number: 5,148,176

[45] Date of Patent: Sep. 15, 1992

[54] MEASURING DEVICE

[75] Inventors: Timothy A. Beattie, Eltham; Jeffrey J. Felice, Matraville, both of Australia

[73] Assignee: ICI Australia Operations Proprietary Limited, Australia

[21] Appl. No.: 728,872

[22] Filed: Jul. 12, 1991

[30] Foreign Application Priority Data

Jul. 13, 1990 [AU] Australia ............................. PK1168

[51] Int. Cl.$^5$ ...................... G01S 13/50; G01S 15/50; E21C 41/26
[52] U.S. Cl. .................................. 342/104; 342/192; 367/90; 299/13
[58] Field of Search ................... 299/13; 342/22, 104, 342/192, 460, 28, 116, 196, 90, 58, 190; 367/90, 906

[56] References Cited

U.S. PATENT DOCUMENTS

| 3,731,306 | 5/1973 | Andrews | 342/192 |
| 3,938,147 | 2/1976 | Kalmus | 343/7 PF |
| 4,271,411 | 6/1981 | Takashi | 343/5 DD |
| 4,358,835 | 11/1982 | Fage | 367/87 |
| 4,443,792 | 4/1984 | Pidgeon et al. | 342/196 X |
| 4,641,138 | 2/1987 | Opitz | 342/61 |
| 4,673,940 | 6/1987 | Barley et al. | 342/192 |

FOREIGN PATENT DOCUMENTS 66204 6/1991 Australia .

OTHER PUBLICATIONS

M. I. Skolnik, "Radar Handbook", McGraw-Hill, 1970, pp. 10-1 to 10-10.
Hamid et al., "Monitoring the Velocities of Particulates Using Doppler Radar", Journal of Microwave Power, 10(2), Jul. 1975, pp.163-170.

Primary Examiner—Gilberto Barrón, Jr.
Attorney, Agent, or Firm—Cushman, Darby & Cushman

[57] ABSTRACT

The invention relates to a device and process which utilize the Doppler effect for measurement of the performance of blasting operations, in particular to the measurement of face velocity. The measuring device comprises radiation generating and receiving means and a signal analyzing means.

12 Claims, 3 Drawing Sheets

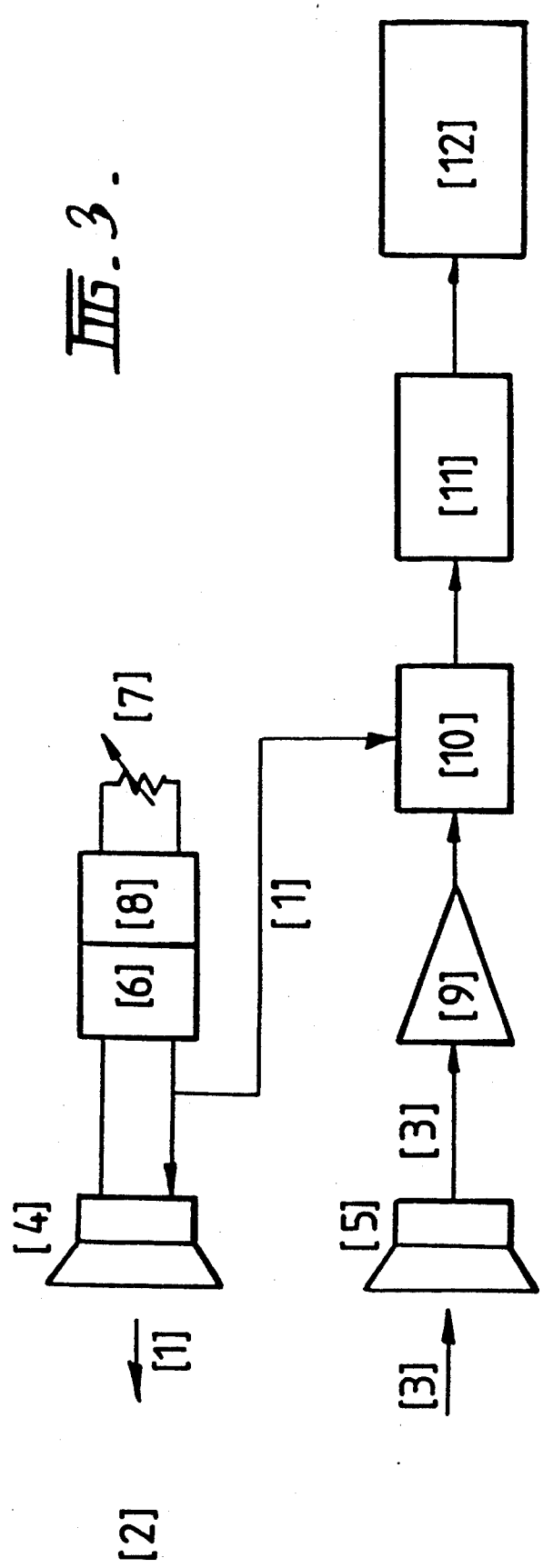

MEASURING DEVICE

The present invention relates to the measurement of the performance of blasting operations, in particular to the measurement of face velocity.

Face velocity is an important parameter in assessing blast performance and relates directly to several factors which are central to the efficiency of a mining operation. The amount of time spent moving material after a blast can be affected by the amount of material thrown clear by the explosive, or the heave, and this can be directly related to the initial face velocity: a high face velocity can indicate more throw and hence less rehandling.

Currently, high speed photography of surface blasting operations is used for diagnosing various aspects of blast performance. Several quantitative features may be derived, including confirmation of the hole initiation sequence, time to first movement, evidence of stemming ejection and measurements of face velocity. Face velocity measurements using high speed film have a number of disadvantages. In order to obtain accurate measurements, it is necessary to place large targets on a face to be blasted, these act as reference points for subsequent measurements. Nevertheless, the analysis of high speed photography to provide face velocities is a difficult and time consuming task and the analysis requires experience and can only be done after the film has been developed.

There is provided, in accordance with the present invention, a radar apparatus adapted to measure face velocity of blast faces in blasting operations wherein said radar apparatus comprises a doppler module, a parabolic reflector and a signal analysing means, the doppler module being located at or near the focal point of the parabolic reflector, and being capable of generating and receiving microwave signals, said doppler module additionally comprising a horn adapted to facilitate the transmittance of a generated microwave signal onto the parabolic reflector.

A simple description of rock movement in a blast will assist in understanding the data recorded by the radar system. As each hole detonates during a blast, the rock immediately in front of the hole will usually start moving as one unit, that is, all at one velocity. It will then take a little more time for the rock between holes to start moving. As a face starts to move, it will fragment into individual rocks each of which will travel at its own velocity. After the first few milliseconds, most of the fragment velocities will lie around an average, but some fragments might travel at a much higher velocity as flyrock, and some may not be thrown at all. Because of all these fragments we find that a complete picture of the face velocity does not consist of a single number, but rather a distribution of rock velocities. From this rock velocity distribution, we may interpret several quantities such as average face velocity, peak face velocity, or amount of flyrock, and assign any or all of these to be indicative of the blast performance.

The face velocity radar illuminates all or a selected region of a blast face with microwave radiation. The signal reflected from the blast face may be continuously monitored by the face velocity radar. The rock movement which follows initiation of the blast results in a Doppler shift in the signal detected by the face velocity radar. This signal is able to be interpreted in terms of a velocity distribution of the rocks within the illuminated area.

There is also provided, in accordance with the present invention, a process for measuring face velocities in a blasting operation, comprising the steps of:
 a) illuminating an area of a blast face with microwave radiation;
 b) initiating explosive charges, thereby setting into motion the blast face;
 c) detecting the microwave radiation reflected from the moving blast face; and
 d) interpreting the detected radiation in terms of a velocity profile of the blast face.

The face velocity radar is further described with reference to the drawings. FIG. 1 shows a face velocity radar (1) and its location with respect to the blast face (5). A blasting operation involves the placement of a number of explosive charges in boreholes (6). The face velocity radar (1) comprises a doppler module (2) which is located at the focal point of a parabolic reflector (3). The doppler module (2) continuously generates a microwave signal which is transmitted through a horn (7) onto the parabolic reflector (3) the microwave signal illuminates a selected area of the blast face (5). The microwave signal which illuminates the blast face (5) is reflected back from the blast face (5) to the face velocity radar (1). The parabolic reflector (3) focusses the reflected signal into the doppler module (2). The doppler module (2) converts the detected microwave signal into an electrical signal which is transmitted to a signal analysing means (4). The signal analysing means (4) may comprise an amplifier to increase the signal to noise ratio of the electrical signal. The electrical signal may be recorded by any convenient means. The signal analysing means converts the electrical signal to a velocity profile of the blast face.

Laboratory calibrations and field trials of the radar unit indicate that it can measure rock velocities within the range of 3 m/s to 90 m/s with an accuracy of up to 0.1 m/s at distances of up to 900 m away from the rock face.

The focussing properties of the parabolic reflector rely on its exact shape and on manufacturing tolerances being less than one-tenth the size of the microwave wavelength which in this case is 12.4 mm. The diameter of the parabolic reflector must be large enough that all of the beam emitted by the microwave unit is reflected off the parabolic reflector. The exact position of the microwave unit near the focus of the parabolic reflector will affect reception area and signal strength.

In a preferred embodiment of the parabolic reflector used in the current invention, the reflector is parabolic all the way to the outer rim, is turned out of aluminium, has a focal length of 420 mm and no part of the parabolic reflector is closer to or further from the Doppler module than 1.24 mm.

In a preferred embodiment of the invention the microwaves are emitted by a K-Band CW Doppler Module of $5.0 \pm 0.2$ VDC operating voltage, 150 mA maximum operating current and having a microwave power emission level of less than one-thousandth of the Australian Standard AS 2772-1985 recommendation of 1 mW per square centimeter for limited exposure at frequency of 24.15 GHz.

Attached to the Doppler Module is a horn which directs microwaves from the module to the parabolic reflector. In a preferred embodiment the horn of the current invention is designed to a shape and tolerance which concentrates microwaves onto as large as possible an area but with minimum leakage around the edges in order to maximise signal strength and radar reception efficiency.

An amplifier unit may be used to power the Doppler Module and amplify the signal from the module to facilitate recording. In a preferred embodiment the amplifier unit has a response curve which is flat to within 2% tolerance from 900 Hz to 15 kHz, and flat to within 5% tolerance from 500 Hz to 25 kHz, these frequency bands corresponding directly to velocity ranges of 5.6 to 93 m/s (at 2% accuracy) and 3 to 155 m/s (at 5% accuracy).

It will be obvious to the skilled worker that once a blast has been recorded on tape (or other convenient medium) using the face velocity radar, the raw signal may be analysed in several ways. Viewing this signal is not essential but it can give further information than that from the rock velocity distribution alone, and it may be viewed simply on a storage oscilloscope, or a digital recording system and computer if available.

The signal analysing means may be directly connected to the Doppler module or may be indirectly connected such that the signal analysing means is remote from the parabolic dish and Doppler module. Indirect connection of the signal analysing may be desirable where the signal analysing means is difficult to transport to the blast site or is not suitable for operation in the relatively hostile environment of a blast site. The means of indirect connection may allow real-time analysis of the data such as via a signal transmitting device. More preferable, as radio transmitters and the like are often not permissible at blasting operations, the indirect connection may be achieved by a suitable recording means such as a tape recording device. The recording is then played back into the signal analysing means at a convenient time and location and the face velocity measurements obtained.

It will also be obvious to the skilled worker that the final rock velocity distribution can be obtained by separating the time domain recording into its frequency components and this is normally done by Fourier transform on a computer or by a spectum analyser.

Figure 2:
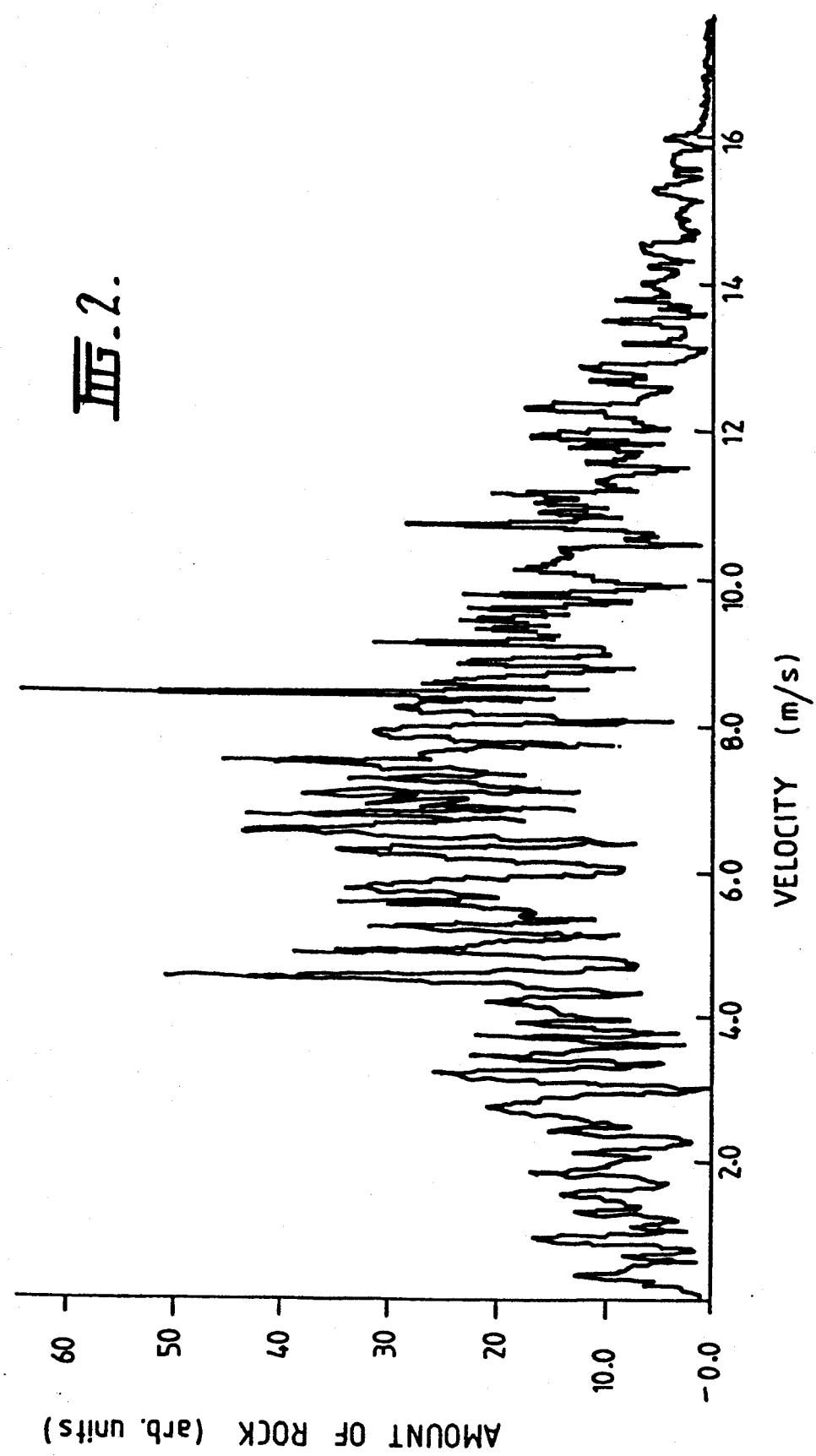

A typical face velocity distribution for a quarry is shown in FIG. 2. Each peak within the distribution corresponds to a rock or series of rocks moving at one velocity. The detailed face velocity information obtained by the microwave radar is indicated by the complexity of the distribution.

The Doppler effect employed by the radar device as hereinabove described can be further described with reference to FIG. 3. FIG. 3 depicts an ultrasonic wave (1) of frequency $f_1$, being directed towards moving objects (2) causing a return (or echo) frequency (3) of frequency $f_3$, returns to the sender. The return frequency is slightly shifted (doppler effect) from the transmitted frequency. The frequencies $f_3$ are proportional to $f_1$ and the velocities of the projectiles relative to the transmitter (4) and the receiver (5).

In a preferred embodiment, the transmitter (4) emits a 40 kHz ultrasonic wave (1) which is emitted by a transducer (6). The frequency is adjusted to suit the transducer using a variable resistor (7) connected to an oscillator (8).

The returning echo (3) is picked up by the receiver (5) and amplified by an amplifier (9) to a suitable level for the demodulation stage. In a preferred embodiment of the current invention the demodulation is synchronous, homodyne or coherent detection. In a preferred embodiment the format of the demodulator is of the switching type but is not limited to it. It will be apparent that any synchronous (multiplier) detector could be used.

The output of the detector or mixer (10) are waves of frequencies $f_1+f_2$ and $f_1-f_2$ with the inputs being the transmitted frequency $f_1$ chopping frequency) and the returned frequency $f_2$. It should be noted that $f_2$ could be a number of different frequencies from different objects. Both $f_1-f_2$ contain the same information about the doppler frequencies.

Ultrasonic waves of either frequency $f_1-f_2$ or $f_1+f_2$ can be chosen for measurement. Filters (II) can be used to remove the frequency which is not required for analysis. The frequency required for analysis passes through the filters (II) to the signal analysing means (12). Any convenient analysis technique such as Fourier Transformation yields the velocities of the objects.

In a preferred embodiment the current invention uses frequency $f_1-f_2$ for analysis. A low pass filter is used to extract the $f_1-f_2$ frequency and reject all higher multiples and frequency $f_1+f_2$. A suitable band pass filter may also be used to remove very low and very high frequencies outside the frequency range of interest.

As the wavelength of the microwaves used in this module are so small, it is possible to achieve high precision measurements of rock movement. Rock movement as small as 6 mm can be detected (as long as the rock is large enough), although an accurate velocity cannot be stated at this detection limit. To give a figure for the average velocity the limit would be around 60 mm, and for a full rock velocity distribution the resolution limit is around 2 m.

Using a preferred embodiment of the face velocity radar, the current invention has been used to measure rock velocities within the range of 2 m/s to 40 m/s at distances of 220 m to 500 m away from the rock face and showed median face velocities of 8 m/s.

The Doppler effect employed by the radar device as hereinabove described is also evident in other radiation bands. The utility of present invention is not limited to employing microwave radiation. Another radiation band suitable for measuring face velocities is the ultrasonic frequency band. There is provided an ultrasonic device adapted to measure face velocity of blast faces in blasting operations wherein the ultrasonic device comprises an ultrasonic generator, a transmitting device, a receiving device and a signal analysing means wherein the transmitting device transmits ultrasonic radiation and the receiving device receives the radiation after it has been reflected from the blastface.

Ultrasonic devices are particularly suited for measuring face velocities of small areas of a blastface. As they are inexpensive to produce, they are often located close to the blastface where the ultrasonic radiation generated can be directed onto a small area of the rockface. Use of a parabolic reflector is optional. The ultrasonic device thus located can provide detailed information about these small areas in the first few moments after detonation of the blastface.

Devices located close to a blastface are usually destroyed soon after detonation of the blast hence the signal analysing means or other suitable recording means are usually remotely located from the ultrasonic generator, transmitting device and receiving device. A long connector such as a wire or electrical cable are usually suitable to enable adequate separation of the signal analysing means or recording device from the other elements of the ultrasonic device.

The face velocity radar provides a simple, accurate field technique for measuring face velocities.

We claim:

1. A radar apparatus adapted to measure face velocity of blast faces in blasting operations wherein said radar apparatus comprises a doppler module, a parabolic reflector and a signal analysing means, the doppler module being located at the focal point of the parabolic reflector, and being capable of generating and receiving microwave signals, said doppler module additionally comprising a horn adapted to facilitate the transmittance of a generated microwave signal onto the parabolic reflector, said signal analysing means comprising an amplifier having a response curve which is flat to within 2% tolerance from 900 Hz to 15 kHz and flat to within 5% tolerance from 500 Hz to 25 kHz.

2. A radar apparatus according to claim 1 wherein the parabolic reflector has a focal length of 420 mm and no part of the parabolic reflector is closer to or further from the Doppler module than one tenth of the microwave wavelength.

3. A radar apparatus according to claim 1, wherein the signal analysing means is directly connected to the Doppler module.

4. A radar apparatus according to claim 1 wherein the signal analysing means is indirectly connected to the Doppler module such that the signal analysing means is remote from the parabolic dish and Doppler module.

5. A radar apparatus according to claim 4 wherein the indirect connection between the signal analysing means and the Doppler module is a tape recorder or other suitable recording device.

6. A process for measuring face velocities in a blasting operation, comprising the steps of:
   a) illuminating an area of a blast face with microwave radiation;
   b) initiating explosive charges, thereby setting into motion the blast face;
   c) detecting the microwave radiation reflected from the moving blast face; and
   d) interpreting the detected radiation in terms of a velocity profile of the blast face.

7. An ultrasonic device adapted to measure face velocity of blast faces in blasting operations wherein said ultrasonic device comprises an ultrasonic generator, a transmitting device, a receiving device and a signal analysing means wherein the transmitting device transmits ultrasonic radiation and the receiving device receives the radiation after it has been reflected from the blast face and the signal analysing means comprises an amplifier having a response curve which is flat to within 2% tolerance from 900 Hz to 15 kHz and flat to within 5% tolerance from 500 Hz to 25 kHz.

8. An ultrasonic device according to claim 7 wherein a parabolic reflector focusses the reflected radiation into the receiving device.

9. An ultrasonic device according to claim 7 or 8 wherein the signal analysing means is directly connected to the receiving device.

10. An ultrasonic device according to claims 7 or 8 wherein the signal analysing means is indirectly connected to the receiving device such that the signal analysing means is remote from the ultrasonic wave receiving device.

11. An ultrasonic device according to claim 10 wherein the indirect connection between the signal analysing means and the receiving device is a tape recorder or other suitable recording means.

12. A process for measuring face velocities in a blasting operation, comprising the steps of:
   a) illuminating an area of a blast face with ultrasonic radiation;
   b) initiating explosive charges, thereby setting into motion the blast face;
   c) detecting the ultrasonic radiation reflected from the moving blast face; and
   d) interpreting the detected radiation in terms of a velocity profile of the blast face.

* * * * *